(12) United States Patent
Pino

(10) Patent No.: US 6,554,018 B1
(45) Date of Patent: Apr. 29, 2003

(54) WATER CLOSET FLUSHING SYSTEM

(76) Inventor: Wilton J. Pino, 12233 S. Choctaw, Baton Rouge, LA (US) 70815

( * ) Notice: Subject to any disclaimer, the term of this patent is extended or adjusted under 35 U.S.C. 154(b) by 0 days.

(21) Appl. No.: 10/039,497

(22) Filed: Oct. 24, 2001

(51) Int. Cl.[7] ............................................... F16K 24/00
(52) U.S. Cl. ....................... 137/218; 137/218; 137/526
(58) Field of Search ................................ 137/218, 526, 137/853; 251/34, 37, 40; 138/46

(56) References Cited

U.S. PATENT DOCUMENTS

| 624,569 | A | * | 5/1899 | Stover | 138/46 X |
| 2,148,968 | A | * | 2/1939 | Shanley | 251/40 X |
| 2,382,427 | A | * | 8/1945 | Langdon | 137/218 |
| 2,675,823 | A | * | 4/1954 | Langdon | 137/218 |
| 2,897,835 | A | * | 8/1959 | Philippe | 137/218 |
| 2,940,464 | A | * | 6/1960 | Moen | 137/218 |
| 3,082,790 | A | * | 3/1963 | Whitney | 251/40 X |
| 3,334,646 | A | * | 8/1967 | Billeter et al. | 137/218 |

* cited by examiner

Primary Examiner—Robert M. Fetsuga
(74) Attorney, Agent, or Firm—Roy, Kiesel, Keegan & DeNicola

(57) ABSTRACT

An improved water closet flushing system utilizing a diaphragm flush valve having a fluid flow control means positioned to receive the fluid discharged from the diaphragm flush valve prior to fluid entering the water closet bowl.

1 Claim, 6 Drawing Sheets

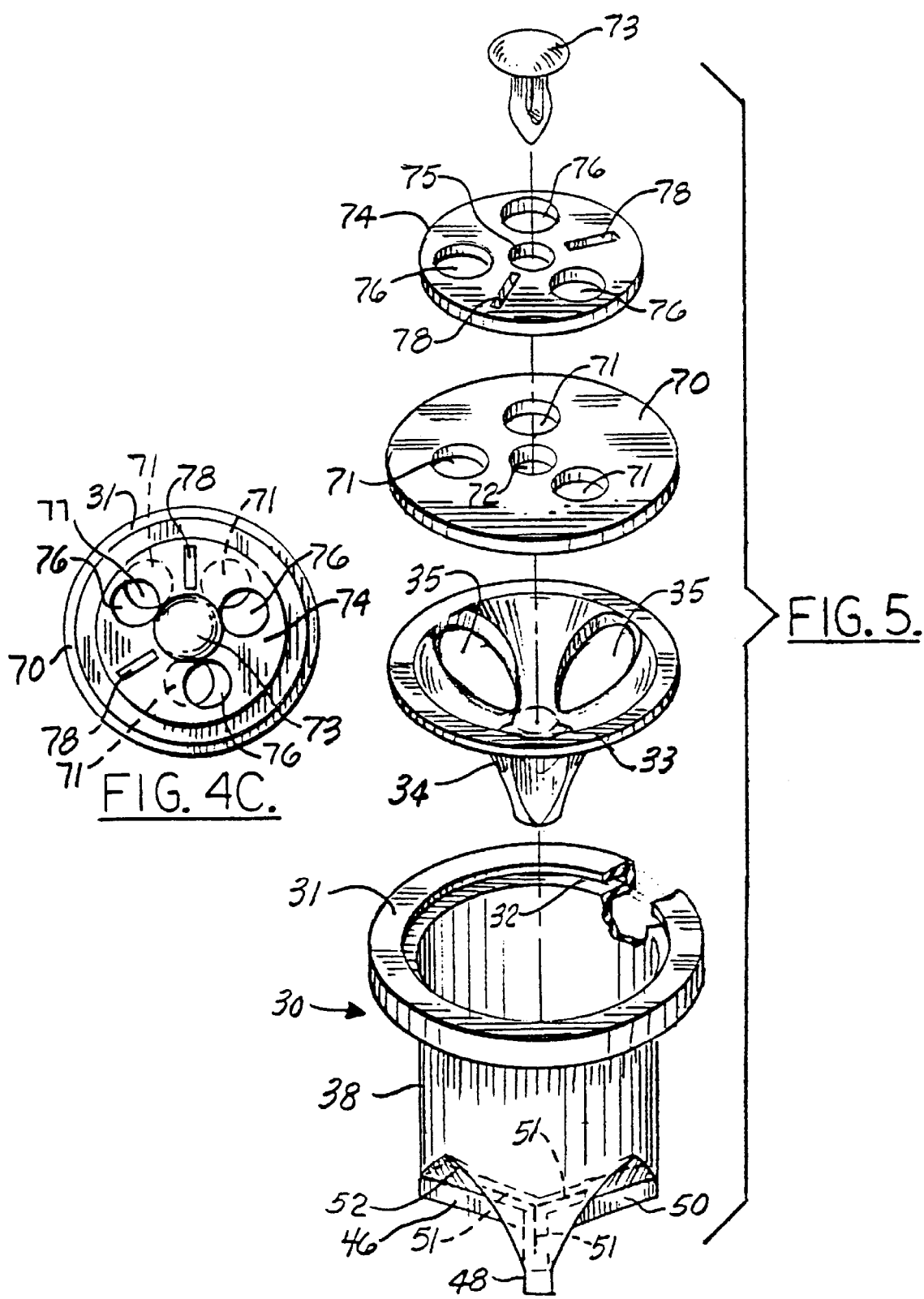

WATER CLOSET FLUSHING SYSTEM

BACKGROUND OF THE INVENTION

1. Field of the Invention

This invention relates in general to water closet systems, and more particularly, to an improved means to control during the flushing cycle the pressure differential between the inlet and outlet chambers of a diaphragm flush valve used in the water closet system.

2. Prior Art

Flush valves, and in particular flush valves used in the construction of water closets or urinals, have been used for many years. See, for example, U.S. Pat. No. 30,462 issued Oct. 23, 1860. However, the forerunner to one of the most popular modern diaphragm flush valve designs is disclosed in U.S. Pat. No. 1,714,573 issued May 28, 1929, and commonly referred to as a diaphragm flush valve. A modern version of the diaphragm flush valve is disclosed in U.S. Pat. No. 6,227,219 entitled "Flush Relief Valve Having Improved Vacuum Breaker" and issued on May 8, 2001 by the inventor herein.

One reoccurring problem with the use of a diaphragm flush valve has been the unacceptable high pressure of the water supply used to operate the flush valve. For a particular diaphragm flush valve used in water closet systems there will be a desired water pressure to the inlet chamber of the flush valve that permits a proper discharge rate to the water closet bowl. For most systems that pressure is about 50 pounds per square inch. Unfortunately, the pressure of the water supply is often too high for the water closet system to properly function.

Prior art attempts to solve this problem have focused on controlling the water supply pressure. These attempts have not been as effective as would be desired. If the water pressure is set too low, then the valve does not get enough water to consistently function properly. A second problem has been in training personnel to correctly adjust the water pressure at the inlet opening of the valve inlet chamber.

OBJECTS AND SUMMARY OF THE INVENTION

Therefore, one object of this invention is to provide an improved water closet system having means to properly maintain the water pressure in the system at levels to achieve the desired water discharge into the water closet bowl.

Another object of this invention is to provide an improved water closet system that is easy to adjust without significant training by the plumber.

Still another object of this invention is to provide an inexpensive means to control the water pressure in a diaphragm flush valve during the flushing cycle.

Other objects and advantages of the invention will become apparent from the ensuing descriptions of the invention.

The problem of excess water pressure at the inlet opening can be substantially overcome by controlling the pressure differential between the inlet and outlet chambers of the flush valve during the flushing cycle. This can be achieved by use of a fluid flow control means positioned between the outlet chamber discharge opening and the vacuum breaker upstream opening.

The type of fluid flow control means can include any fluid flow restricting member that will restrict the discharge water flow from the outlet chamber to the vacuum breaker to the desired rate to achieve a controlled discharge into the water closet bowl. The fluid flow restricting member can include any of the many known fluid control types of valves that could be mounted on one side to the flush valve and on the other side to the discharge pipe containing the vacuum breaker. The fluid flow restricting member could also include a disc having a predetermined cross-sectional area opening positioned at the upstream opening of the vacuum breaker. The fluid flow restricting member could also include a regulating member, such as opposing rotating discs having a composite opening formed by openings in each of the discs that can be aligned to vary the cross-sectional area of the composite opening.

BRIEF DESCRIPTION OF THE DRAWINGS

The specification and the accompanying drawings show and describe preferred embodiments of this invention, but it is to be understood that these embodiments are not intended to be exhaustive nor limiting of the invention, but on the contrary are given for the purpose of illustration in order that others skilled in the art may fully understand the invention and the principles thereof and the manner of applying them in practical use so that they may modify and adapt the invention in various forms, each as may be best suited to the conditions of a particular use.

FIG. 4C is a top view of the dual rotating disc fluid flow control device of this invention.

FIG. 5 is an exploded view of opposing rotating discs that can be used as a fluid flow control means in accordance with this invention.

PREFERRED EMBODIMENTS OF THE INVENTION

As used in this patent, the term "diaphragm flush valve" refers to a flush valve having a fluid inlet chamber, an upper chamber and an outlet chamber, wherein the chambers are separated from one another by a flexible diaphragm provided with a by-pass opening connecting the fluid inlet chamber to the upper chamber and with a central opening connecting the upper and outlet chambers, which central opening is sealable by a relief valve assembly comprising a relief valve having a vertically disposed stem about which a sleeve member can freely slide a predetermined distance, and a plunger assembly having a flush initiating means which when engaged causes a plunger pin to operatively contact the sleeve member unseating the sealing member and permitting flow of fluid from the upper chamber to the lower chamber. Without any intent to restrict the definition of diaphragm flush valves, examples of such are described in U.S. Pat. Nos. 1,714,573, 2,776,812, 3,399,860, 3,556,137, 3,656,499, 4,327,891, 5,013,007, 5,026,021, 5,295,655, 5,335,694, 5,415,374, and 5,649,686.

Also as used in this patent, the term "vacuum breaker assembly" is used to include any device utilized to prevent back siphonage from a polluted fluid source, such as a toilet, back into the non-polluted fluid supply feeding into device, which is constructed having an elastomeric inner liner with a receiving end into which the fluid is received by the device and a discharge end having a sealable opening through which the fluid must pass before being discharged from the device. Without any intent to restrict the definition of vacuum breaker assembly, examples of such are described in U.S. Pat. Nos. 3,334,646, 3,797,515, 5,060,687, 5,454,396, and 5,564,460.

Figure 1:
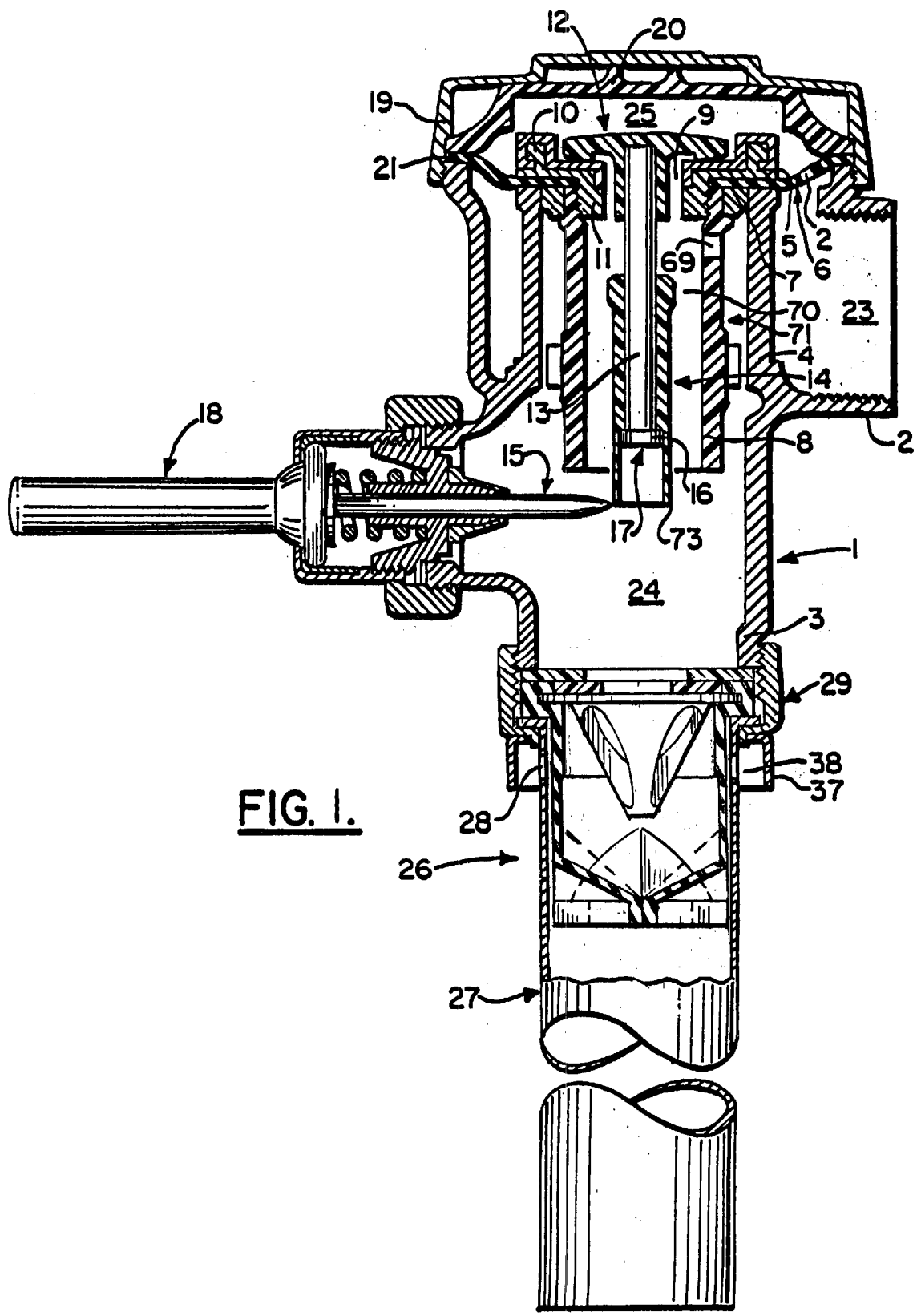
FIG. 1 is a cross-sectional view of a diaphragm flush valve and vacuum breaker assembly having a fluid flow control disc positioned for use in a typical water closet to regulate the pressure differential between the inlet and outlet chambers of the flush valve during the flushing cycle.
Figure 2:
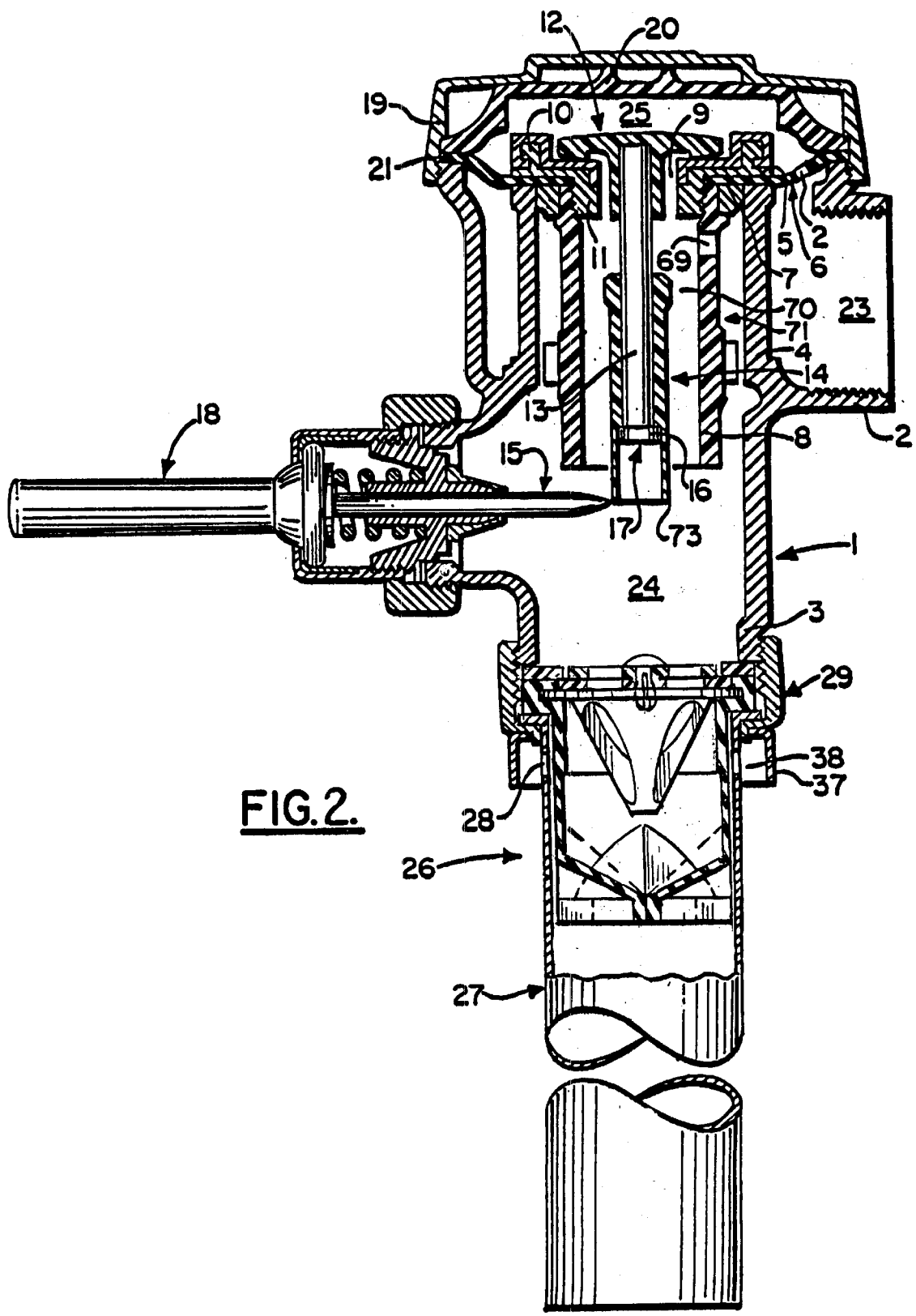
FIG. 2 is a cross-sectional view of a diaphragm flush valve and vacuum breaker assembly having opposing fluid flow control discs positioned for use in a typical water closet to regulate the pressure differential between the inlet and outlet chambers of the flush valve during the flushing cycle.

A particular embodiment of a diaphragm flush valve and a vacuum breaker assembly installed in a water closet is illustrated in FIG. 1. The flush valve includes the brass body 1 provided with an inlet section 2 connectable to a pressurized water supply whereby water flows through inlet opening 2A into inlet chamber 23. Section 2 forms inlet chamber 23. Body 1 also is provided with an outlet section 3 forming an outlet chamber 24 through which water exits the flush valve. Between the inlet and outlet sections there is an internal upstanding barrel 4. The upper edge portion of barrel 4 forms the annular main valve seat 5. The main valve member comprises a flexible circular rubber diaphragm 6 having a bottom valve seating portion 7 and which is clamped to the top end of a cylindrical guide member 8, made of a plastic material such as CYCLOLAC®, extending downward within the barrel 4. The diaphragm 6 is provided with a central opening 9 through which a clamping disc 10 extends with a portion 11 threaded into the guide member 8 and thereby clamps the diaphragm 6 tightly between them. A relief valve 12 which may be made of DELRIN® plastic material is carried by the clamping disc 10 and has a depending operating stem 13 made of brass or other metal. Stem 13 extends downward through the diaphragm opening 9 and within the guide member 8. Sleeve member 14 which telescopes about stem 13 may be made of DELRIN® plastic material and is positioned opposite plunger pin 15 when it rests on the upper surface of shoulders 16 forming a stop member 17 at the lower end of stem 13. Plunger pin 15 actively engages sleeve member 14 by its inward movement into the flush valve outlet chamber 24 when handle 18 is moved off axis from plunger pin 15. Other flush initiating means include various electronic sensors or mechanical push button devices, such as described in U.S. Pat. Nos. 2,507,966, 2,688,141, 3,066,314, 3,695,288, 3,778,023 and 4,891,864.

The valve body 1 is provided with an external cover 19 and an internal cover 20, the latter preferably being made of an ABS plastic molded material such as CYCLOLAC®. The external cover 19 is screw threaded around the top end of the body 1 and provided with a shoulder which engages the outer peripheral edge of internal cover 20 and presses it downwardly against the edge 21 of the diaphragm 6 to clamp the diaphragm firmly around its periphery into position in the valve body.

In the ordinary operation of the flush valve described, the water pressures in inlet chamber 23 and upper chamber 25 are equalized above and below the diaphragm 6 by the flow of water through the small by-pass opening 22. Since the pressure area above the diaphragm in upper chamber 25 is greater than that in outlet chamber 24 below the diaphragm, the diaphragm is held tightly against main valve seat 5, thereby shutting off the water flow between the inlet chamber 23 and outlet chamber 24. The engagement of the plunger pin 14 with sleeve member 14 causes sleeve member 14 to tilt stem 13 from its vertical axis. The tilting of stem 13 causes relief valve 12 to also tilt from its seat. With relief valve 12 tilted, water can flow from the upper chamber 23 through guide member 8 and into the outlet chamber 24 reducing the pressure in upper chamber 23. This reduction in pressure now permits water from inlet chamber 23 to flex and lift diaphragm 6 from main valve seat 5 permitting water to flow from inlet chamber 23 over the top edge of barrel 4 and into outlet chamber 24 to initiate the flushing action. Once plunger pin 15 is no longer operatively contacting sleeve member 14; i.e., no longer causing sleeve member 14 to tilt or otherwise prevent relief valve 12 from reseating, relief valve 12 can be reseated. This allows water from the inlet chamber 23 to refill upper chamber 25 until the pressure in upper chamber 25 is again equalized to that in inlet chamber 23. With the pressure again equalized, diaphragm 6 reseats preventing further flow of water from the inlet chamber 23 to the outlet chamber 24. The amount of water which flows into the outlet chamber 24 is controlled at least in part by the time required to achieve pressure equalization in the inlet and upper chambers resulting from the refilling of upper chamber 25 with water.

Sleeve member 14 depending from stem 13 is constructed to slide up along stem 13 a sufficient distance to permit sleeve member 14 to rest in a non-operative position above plunger pin 15 if the flush handle 18 is held unduly long in the operated position. In this position the relief valve 12 is no longer tilted and will automatically reseat closing central opening 9. In a normal flushing action, flush handle 18 is pushed off axis and then quickly released. In this case, sleeve member 14 descends to its original position and relief valve 12 is reseated. Typically, this unseating and reseating of the relief valve 12 takes place in less than one second, which is sufficient time to permit diaphragm 6 to be unseated by the water pressure in inlet chamber 23 and for the desired amount of water to flow first into outlet chamber 24 and then through vacuum breaker assembly 26 to the water closet bowl (not shown) to complete the flushing action.

To prevent wastewater backup into the flush valve and possibly the water supply lines, government regulations require the use of some type of structure to prevent this possibility from occurring. One such structure is a vacuum breaker assembly.

FIG. 1 illustrates one type of standard vacuum breaker assembly, such as described in U.S. Pat. No. 5,564,460, that is used in a water closet to prevent back siphonage from the water closet back into the potable water supply feeding the flush valve. Vacuum breaker assembly 26 includes an outlet tube 27 having peripherally spaced air openings 28. A coupling nut 29 is used to attach vacuum breaker assembly 26 to lower section 3. The downstream end of outlet tube 27 will be connected to the inlet side of the water closet or urinal (not shown).

Positioned inside of outlet tube 27 is a vacuum breaker inner liner 30 that is suitably formed of a rubber like or flexible elastomeric material. As is illustrated in FIGS. 4 and 4A–C, the upstream end of vacuum breaker inner liner 30 includes a flange 31 having a recess 32 which supports the outwardly extending flange 33 of an insert or stiffening funnel 34. Stiffening funnel 34 includes a plurality of openings 35 for the passage of water. A slip ring 36 is seated on top of flange 31 and forms a portion of the connection between the coupling nut 29 and the outlet end of the flush valve. There is a hood 37 that may be crimped onto the lower end of coupling nut 29 and is used as a shield for air openings 28. The hood is spaced from the air openings so that they may perform their intended function of admitting air at atmospheric pressure into the interior of the vacuum breaker assembly 26 to prevent back siphonage.

Vacuum breaker inner liner 30 includes a body 38 constructed from an elastomer which extends from flange 31. The body is cylindrical and terminates at its lower end in a low energy large surface area lip seal 39. There are a plurality of generally equally spaced projections 40 on the exterior of vacuum breaker inner liner 30, with these projections being adjacent the downstream end of the body. They are effective to align, locate and space the exterior wall of body 38 from the interior of the outlet tube so that air from air openings 28 may enter the space beneath the vacuum breaker body 38 to prevent back siphonage.

The lip seal 39 extends from the downstream end of body 38 directly adjacent the projections 40 and includes a gradually outwardly tapering inner surface 41 and a coaxial or cylindrical outer surface 42, with these two surfaces terminating in the end 43 of lip seal 39. The outer surface 42 is generally continuous with the outer cylindrical surface of body 38. The tapered interior surface 41, at its upper end, is an extension of the interior surface 44 of body 38. The shoulders 45 and 47 are formed between lip seal 39 and projections 40 and the interior valve that controls the flow of water through the flexible sleeve. The large surface area lip seal 39, however, is basically a continuation of the interior and exterior surfaces of body 38.

The interior of vacuum breaker inner liner 30 has three lip seals indicated at 46, 48 and 50. Each of these lip seals, at the lower exterior thereof, has ribs 49 which are slightly thicker than other portions of the lip seals, with the ribs defining between them a slit 51 which can open to permit the passage of water through the vacuum breaker assembly 26. Each of the ribs 49, at their upper ends, joins with walls 52 with the upper end of each of the walls 52 being integral with the body 38. There are two walls 52 between each adjacent pair of ribs 51.

In normal use, the flow of water into the vacuum breaker assembly 26 will pass through the stiffening funnel 34, with water pressure forcing the lip seals 46, 48, and 50 to spread apart, permitting water to flow through slits 51 to the water closet, or other plumbing fixtures, connected at the outlet end of the vacuum breaker assembly 26. In the event there is a negative pressure at the water supply, air will flow in through the air openings 28, causing the walls of the vacuum breaker inner liner 30 to collapse upon the support funnel 34, preventing the passage of water from the downstream water closet into the potable water supply. In the event there is a dramatic increase in back pressure because of a water closet restriction as described, the downstream lip seal 39, being thin and directly adjacent the wall of the outlet tube, will rapidly move outwardly against the wall to seal air openings 28.

Figure 4:
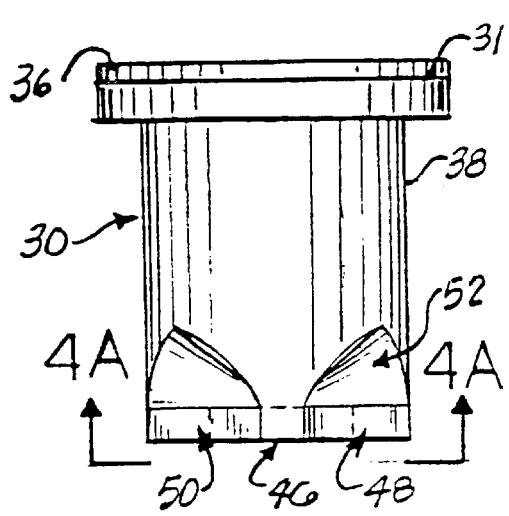
FIG. 4 is a side view of a conventional vacuum breaker accommodating a fluid flow control disc used in accordance with the invention.
Figure 4B:
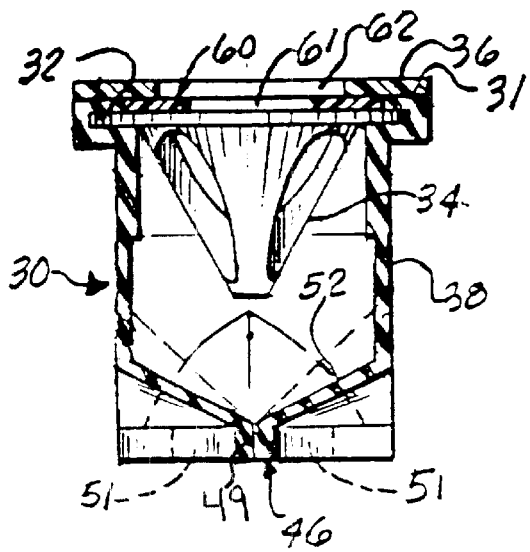
FIG. 4B is a cross-sectional view of the vacuum breaker of taken along lines B—B of FIG. 4A.
Figure 4A:
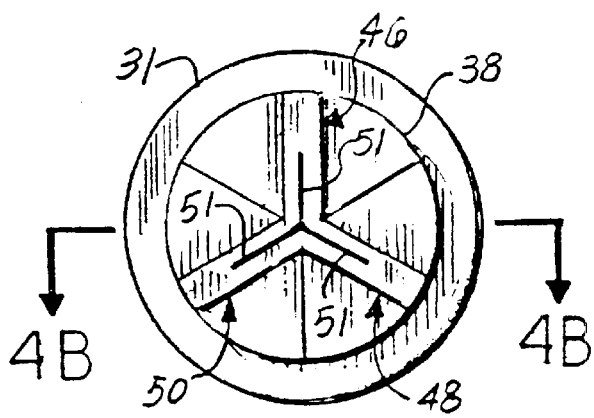
FIG. 4A is a bottom view of the vacuum breaker of FIG. 4 taken along lines A—A.
Figure 4D:
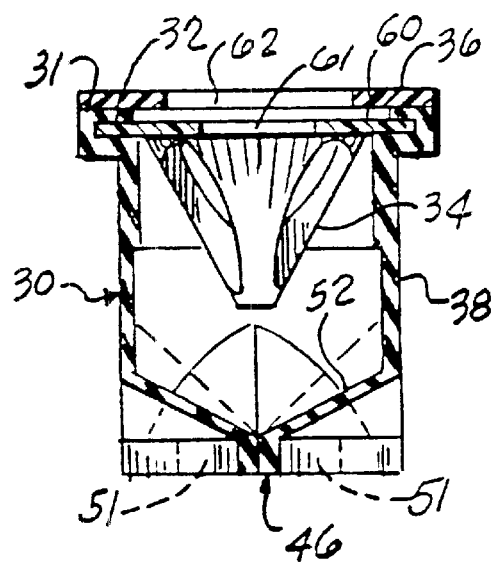
FIG. 4D is an alternate body illustrating a stiffening funnel that can also function as the fluid flow control means.
Figure 6:
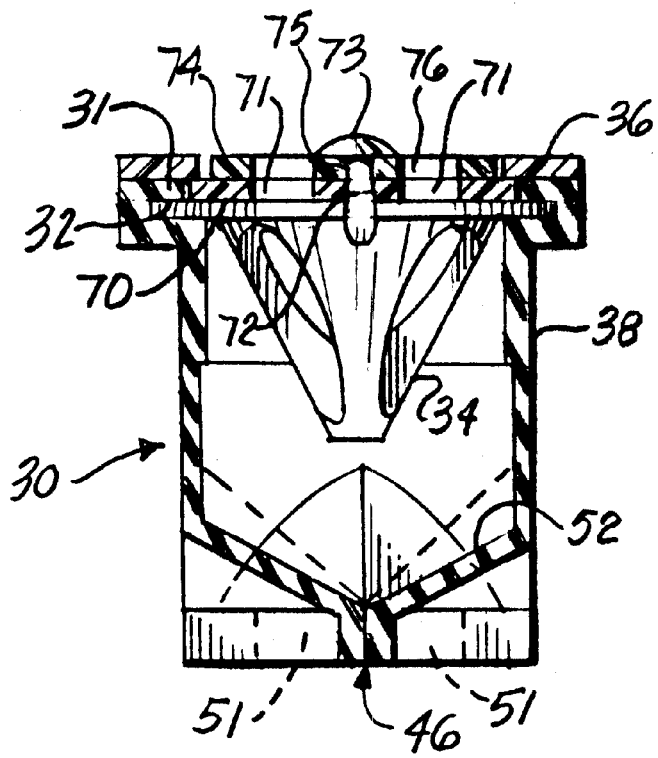
FIG. 6 is a cross-sectional view of the vacuum breaker similar to that of FIG. 4B, but with the opposing rotating discs of FIG. 5 substituted for the single disc shown in FIG. 4B.

Referring to FIGS. 1 and 4B one preferred embodiment of the fluid flow control means is illustrated. In this embodiment the fluid flow control means comprises a plate 60 shaped to rest on top of stiffening funnel 34 and within recess 32 of flange 31. Plate 60 is provided with a pressure regulating opening 61 having a cross-sectional area to create a desired fluid pressure differential between inlet chamber 23 and outlet chamber 24 during the flushing cycle. In a typical water closet system a cross-sectional area between about 0.05 and 0.80 square inches is preferred. In this embodiment slip ring 36 is constructed so that it does not block opening 61, but at the same time does not permit plate 60 to pass through slip ring opening 62. One preferred construction is to align the center of smaller ring opening 61 with the center of larger ring opening 62. In this embodiment slip ring 36 will sized to rest on the top of flange 31. In an alternate preferred embodiment plate 60 and stiffening funnel 34 would be of unitary construction. This embodiment is illustrated in FIG. 4D.

Figure 7:
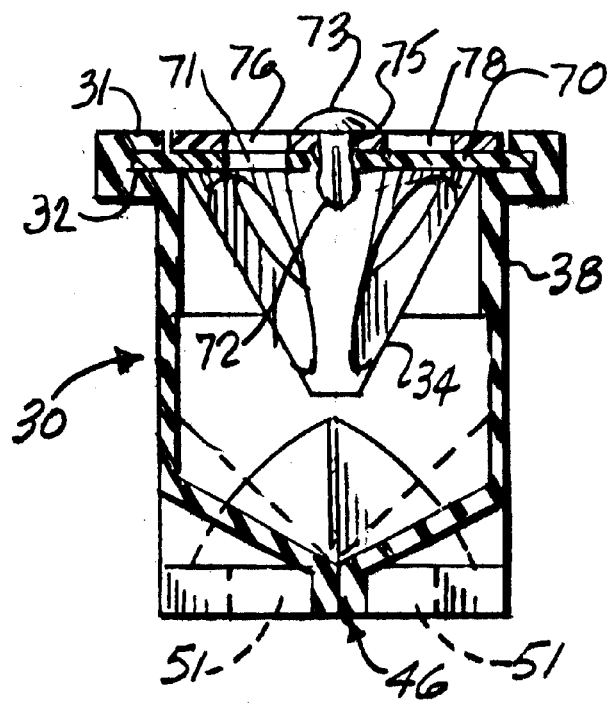
FIG. 7 is a cross-sectional view of an alternate embodiment of the fluid flow control means constructed of a stiffening funnel having pressure regulating openings at its top lip section and disc mounted on the stiffening funnel having pressure regulating openings that can be rotated to be in partial or complete alignment with the stiffening funnel pressure regulating openings.

Referring now to FIGS. 2, 4C, 5, 6 and 7 an another alternate preferred embodiment of the fluid flow control means is illustrated. In this embodiment the fluid flow control means comprises a first disc 70 having one or more pressure regulating openings 71 whose total cross-sectional area is preferably between about 0.05 and 0.80 square inches. Disc 70 is also provided with a central opening 72 through which a rivet type pin 73 can be inserted. In a more preferred embodiment disc 70 will be shaped to rest on top of stiffening funnel 34 and within recess 32 of flange 31. In an alternate preferred embodiment disc 70 will be sufficiently wide to fit completely in recess 32 and be held in position be flange 31 as illustrated in FIG. 7. More preferably, disc 70 and stiffening funnel 34 will be unitarily constructed.

The fluid flow control means also comprises a second disc 74 that is mounted to first disc 70 by pin 73 that through a central opening 75 in a manner to permit at least one of the two disc to rotate with respect to other about pin 73. Second disc 74 also has one or more pressure regulating opening 76 that can be partially or completely aligned with first disc openings 71 to adjust the cross-sectional area of the pressure regulating opening when either of the two discs is rotated about pin 73. The aligned openings form one or more passageways 77 for the fluid from the outlet chamber to pass into stiffening funnel 34. It is preferred that the total cross-sectional area of the portion of pressure regulating openings 76 not blocked by first disc 70 be between about 0.05 and 0.80 square inches. In an alternate preferred embodiment disc 74 can be provided with a means to assist rotating disc 74 into the desired alignment with disc 70. One such means includes one or more slots 78 shaped to receive a tool such as a screwdriver blade that can be used to assist rotating disc 74 into the desired alignment with disc 70.

Figure 3:
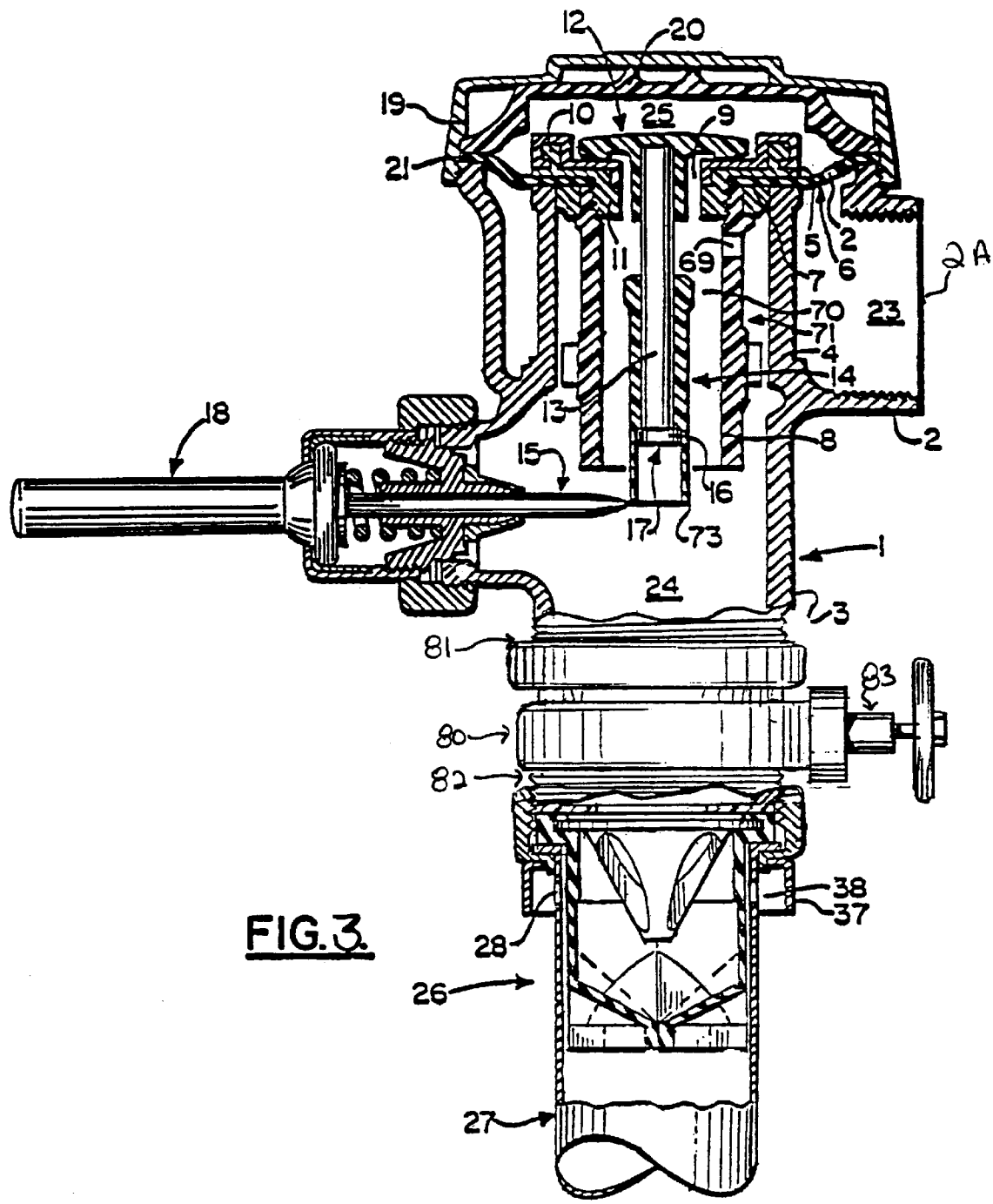
FIG. 3 is a cross-sectional view of a diaphragm flush valve and vacuum breaker assembly having a fluid flow control valve positioned between the outlet chamber and the vacuum breaker for use in a typical water closet to regulate the pressure differential between the inlet and outlet chambers of the flush valve during the flushing cycle.

Referring now to FIG. 3, still another alternate preferred embodiment of the fluid flow control means is illustrated. In this embodiment any type of conventional valve 80 is attached at its fluid receiving side 81 to the outlet chamber 24. It discharge side 82 is attached to the outlet tube 27 containing the vacuum breaker inner liner 30. In this embodiment it is preferred that valve 80 have a gate 83 or other fluid flow metering assembly that forms a pressure regulating opening having a cross-sectional area between about 0.05 and about 0.80 square inches.

In operation the fluid flow control means is inserted between the outlet chamber 24 and outlet tube 27 to receive the fluid existing outlet chamber 24. In the embodiment utilizing plate 60, one selects plate 60 have the size of pressure regulating opening 61 to achieve the desired discharge rate into the water closet bowl. The plumbing system is then connected by attaching valve 80 to outlet chamber 24 to permit fluid to flow and the water closet is flushed. If the observed discharge rate in the bowl is not satisfactory, one can then adjust the cross-sectional area by substituting a second plate 60 having a pressure regulating opening of different cross-sectional area. This procedure can be repeated as often as necessary until the desired discharge rate into the bowl is achieved. The selection of the best cross-sectional area pressure regulating opening 61 will depend on a variety of factors, including the fluid pressure at the inlet chamber, the type of diaphragm flush valve used, the type of vacuum breaker used, and the construction of the water closet.

There are of course other alternate embodiments that are obvious from the foregoing descriptions of the invention. These and the other obvious alternate embodiments are intended to be included within the scope of the invention as defined by the following claims.

What I claim is:

1. A vacuum breaker for use in a plumbing system having a diaphragm flush valve having a body forming an inlet chamber and an outlet chamber connectable through a relief valve in a manner to permit fluid in the inlet chamber to flow into the outlet chamber upon activation of the relief valve, the inlet chamber having an inlet opening connectable to a pressurized fluid supply to permit fluid to enter the inlet chamber, the outlet chamber having an exit opening to permit fluid flowing into the outlet chamber to exit the diaphragm flush valve, the vacuum breaker having an elastomeric inner liner forming an upstream opening to receive fluid discharged from the outlet chamber, the liner forming lip seals having at least one openable slit at a discharge end opposite the upstream opening, the improvement to which comprises a fluid flow control means positioned over the upstream opening to receive fluid exiting from the outlet chamber, the fluid flow control means comprising:

(a) a fluid flow restricting member blocking at least a portion of the flow of fluid through the upstream opening, the member having a pressure regulating opening to permit the fluid to flow through the fluid flow control means and the vacuum breaker, the pressure regulating opening sized to create a desired fluid pressure differential between the inlet chamber and the outlet chamber during discharge of fluid from the inlet chamber to the outlet chamber, and (b) a regulating member rotatably mounted adjacent the restricting member and constructed to vary the cross-sectional area of at least some portion of the pressure regulating opening through which fluid can pass, the regulating member comprises means to assist in rotating the regulating member into a desired position.

* * * * *